United States Patent [19]

Klemann et al.

[11] Patent Number: 4,992,292

[45] Date of Patent: Feb. 12, 1991

[54] TRIS-HYDROXYMETHYL ALKANE DICARBOXYLATE EXTENDED ESTERS AS LOW CALORIE FAT MIMETICS

[75] Inventors: Lawrence P. Klemann, Somerville; John W. Finley, Whippany; Anthony Scimone, Cedar Grove, all of N.J.

[73] Assignee: Nabisco Brands, Inc., East Hanover, N.J.

[21] Appl. No.: 510,042

[22] Filed: Apr. 17, 1990

Related U.S. Application Data

[62] Division of Ser. No. 311,703, Feb. 6, 1989.

[51] Int. Cl.$^5$ ............................ A23D 5/00; C11C 3/00
[52] U.S. Cl. .................................. 426/611; 426/566; 426/601; 426/804; 260/410.6; 560/180; 560/198; 560/199
[58] Field of Search ............... 426/611, 566, 601, 804; 260/410.6; 560/180, 198, 199

[56] References Cited

U.S. PATENT DOCUMENTS

| | | |
|---|---|---|
| 51,980 | 5/1894 | Winter . |
| 2,924,528 | 2/1960 | Barsky et al. .................... 99/118 |
| 2,962,419 | 11/1960 | Minich ................... 167/81 |
| 2,993,063 | 7/1961 | Alsop et al. ................ 260/410.6 |
| 3,495,010 | 2/1970 | Fossel ................... 424/312 |
| 3,579,548 | 5/1971 | Whyte ................... 260/410.7 |
| 3,600,186 | 8/1971 | Mattson et al. ................... 99/1 |
| 3,637,774 | 1/1972 | Babayan et al. ................ 260/410.6 |
| 3,818,089 | 6/1974 | Bayley et al. ................... 424/9 |
| 3,876,794 | 4/1975 | Rennhard ................... 426/152 |
| 4,005,195 | 1/1989 | Jandacek ................... 424/180 |
| 4,304,768 | 12/1981 | Staub et al. ................... 424/180 |
| 4,508,746 | 4/1985 | Hamm ................... 426/601 |
| 4,631,196 | 12/1986 | Zeller ................... 426/580 |

FOREIGN PATENT DOCUMENTS

| | | |
|---|---|---|
| 1106681 | 8/1981 | Canada ................... 99/156 |
| 0205273 | 5/1986 | European Pat. Off. . |
| 0233856 | 8/1987 | European Pat. Off. . |
| 0254547 | 1/1988 | European Pat. Off. . |
| 207070 | 2/1984 | Fed. Rep. of Germany . |
| 3529564 | 3/1987 | Fed. Rep. of Germany . |

OTHER PUBLICATIONS

Barnes, R. S., 13 Lub. eng. 454–458 (1957).
Bell, E. W., 53 J. Amer. Oil Chem. Soc. 511–517 (1976).
Booth, A. N., 40 J. Amer. Oil Chem. Soc. 551–553 (1963).
Goodman and Gilman, 7th ed., 1002–1003 (1985).
Halliburton, W. D., 13 J B C 301–305 (1919).
Hamm, D. J., J. Food Sci. 419–428 (1984).
Haumann, B. F., 63 J. Amer. Oil Chem. Soc. 278–288 (1986).
Lapworth, A., 13 J B C 296–300 (1919).

*Primary Examiner*—Donald E. Czaja
*Assistant Examiner*—Evan F. Ederman

[57] ABSTRACT

Trishydroxymethyl alkanes, notably monomeric and dimeric trishydroxymethyl ethane and propane, esterified with fatty acids or dicarboxylate-extended fatty acid derivatives, are physiologically compatible, partially digestible edible synthetic fat replacements for foods and pharmaceuticals.

32 Claims, No Drawings

TRIS-HYDROXYMETHYL ALKANE DICARBOXYLATE EXTENDED ESTERS AS LOW CALORIE FAT MIMETICS

This is a divisional of copending application Ser. No. 07/311,703, filed on Feb. 16, 1989.

BACKGROUND OF THE INVENTION

This invention relates to the use of monomeric and dimeric trishydroxymethyl alkane fatty acid esters and fatty acid ester derivatives as partially digestible edible synthetic fat replacements in food and pharmaceuticals.

Since fats provide nine calories per gram compared to four calories per gram provided by protein or carbohydrates, major research efforts toward reduction of caloric intake for medical or health reasons have focused on ways to produce food substances that provide the same functional and organoleptic properties as fats, but not the calories.

A major strategy for developing low calorie replacement fats has been to structurally re-engineer natural triglycerides in such a way as to retain their conventional functional properties in foods, while removing their susceptibility toward hydrolysis or subsequent absorption during digestion. To this end, the fatty acids attached to glycerol have been replaced with alternate acids (U.S. Pat. No. 3,579,548 to Whyte); groups have been inserted between the fatty acids and the glycerol backbone ("propoxylated glycerols", Eur. Pat. Ap. No. 254,547 to White and Pollard); the ester linkages have been replaced by ether linkages (U.S. Pat. No. 3,818,089 to Bayley and Carlson, and Can. Pat. No. 1,106,681 to Trost); the ester linkages have been reversed (U.S. Pat. No. 4,508,746 to Hamm); and the glycerol moeity has been replaced with an alternate alcohol (e.g., ethylene glycol in U.S. Pat. No. 2,924,528 to Barskey et al., and U.S. Pat. No. 2,993,063 to Alsop and Carr).

A second major approach to the development of a low calorie fat replacement has been to explore or synthesize nonabsorbable polymeric materials structurally unlike triglycerides, but having physical properties similar to edible fat. Mineral oil was disclosed as early as 1894 (U.S. Pat. No. 519,980 to Winter), and, more recently, polydextrose (U.S. Pat. No. 4,631,196 to Zeller), polyglucose and polymaltose (U.S. Pat. No. 3,876,794 to Rennhard), polysiloxane (Eur. Pat. Ap. No. 205,273 to Frye), jojoba wax (W. Ger. Pat. No. 3,529,564 to Anika), and polyethylene polymers (E. Ger. Pat. No. 207,070 to Mieth, et al. have been suggested.

A third major strategy combines the first two. Rather than restructure triglyceride molecules or find a substitute structurally very dissimilar, this approach explores the use of various polyol esters, compounds which have numbers of fatty acid groups in excess of the three in conventional fat triglycerides, as nonabsorbable fat replacements. Fully esterified sugars were suggested as fat replacements during World War I (notably mannitol, Lapworth, A., and Pearson, L. K., and Halliburton, W. D., et al., 13 *J. Biol. Chem.* 296 and 301 (1919)), and the Southern and Western Regional Research Laboratories of the U.S.D.A. investigated the feasibility of using amylose esters as new-type fats during the 1960's (see Booth, A. N., and Gros, A. T., 40 *J. Amer. Oil Chem. Soc.* 551 (1963) and the references cited therein). More recently, sucrose polyesters have been suggested (U.S. Pat. No. 3,600,186 to Mattson and Volpenhein). The caloric availability and digestibility of a series of dimeric and polymeric glycerides including diglyceride esters of succinic, fumaric, and adipic acids, and polymeric fats from stearic, oleic and short-chain dibasic acids were assessed by the U.S.D.A. group cited supra, and polyglycerol esters have since been suggested (U.S. Pat. No. 3,637,774 to Babayan and Lehman).

Nondigestible or nonabsorbable triglyceride analogues, polyol esters, and polymeric materials have proved disappointing as fat replacements when tested in feeding trials, where gastrointestinal side effects occurred, in some cases so extreme that frank anal leakage was observed (for recent reviews, see Hamm, D. J., 49 *J. Food Sci.* 419 (1984) and Haumann, B. J., 63 *J. Amer. Oil Chem. Soc.* 278 (1986)). Nondigestible fats act as a laxative and are expelled from the body, eliciting foreign body reactions like those early documented for mineral oil (Goodman and Gilman's *Pharmacological Basis of Therapeutics*, 7th ed., Macmillan Pub. Co., N.Y. 1985, pp. 1002–1003). Polyglycerol and polyglycerol esters, for example, suggested as fat replacements supra, have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, or incorporating saturated fatty groups, Eur. Pat. Ap. No. 233,856 to Bernhardt), and dietary fiber preparations have been incorporated into polysaccharide and/or polyol-containing foodstuffs to help inhibit the diarrheal effect (U.S. Pat. No. 4,304,768 to Staub et al.).

SUMMARY OF THE INVENTION

An object of the present invention is to provide a fat replacement more compatible with normal digestion. More particularly, it is an object of the present invention to provide a more digestible fat replacement which interferes less with fat metabolism, thus avoiding diarrhea and other laxative side effects It is a further object of the present invention to provide a partially digestible fat replacement which may, if desired, be engineered to provide essential fatty acids.

In the practice of this invention, trishydroxymethyl alkane ester derivatives, notably fatty acid and dicarboxylate-extended fatty acid esters of monomeric and dimeric trishydroxymethyl alkanes, are partially digestible edible fat replacements. These fat replacements are more physiologically compatible than the nondigestible replacements heretofore developed.

DETAILED DESCRIPTION OF THE INVENTION

Minich suggested neopentyl alcohol esters as fat substitutes in dietetic compositions (U.S. Pat. No. 2,962,419). He used pentaerythritol, a tetrahydric neopentyl sugar alcohol formed when pentaerythrose condensed from acetaldehyde and formaldehyde undergoes a crossed Cannizzaro reaction, in his examples He tested pentaerythritol tetracaprylate in lipase assays and found the "esters are not attacked, hydrolyzed, by the enzyme pancreatic lipase, and therefore, cannot be assimilated" (col. 4, lines 62–64). In a feeding study using the same compound, rats fed pentaerythritol tetracaprylate ad libitum consumed more than control animals on a normal diet. "If the rats on the fat-free diet had been limited to the same amount of food, their weight would have been less" (col. 5, lines 49–51). He concluded that the esters, which "do not break down in the stomach or upper intestinal tract. . . may be used to control the intake of fat" (col. 1, lines 63-65).

Long known to be useful as high temperature lubricants (see reviews by Barnes, R. S., and Fainman, M. Z., 13 *Lub. Eng.* 454 (1957), and Bell, E. W., et al., 53 *J. Amer. Oil Chem. Soc.* 511 (1976)), the family of compounds have since been often cited in patents and periodicals as examples of nondigestible triglyceride analogues which sterically hinder normal fat hydrolysis because of branching on the alcohol side of the triglyceride molecule.

The present invention is based on the surprising finding that trishydroxymethyl alkane esters which have three side chains rather than the four of Minich's pentaerythritol esters, are *not* nondigestible. On the contrary, trishydroxymethyl alkane esters are partially digestible. Slowly hydrolyzed by lipase in vitro, the esters exhibit, in in vivo feeding studies, a caloric availability qualitatively a fraction that of natural fat. Instead of passing through the digestive tract unchanged, eliciting the undesirable side effects of oral foreign nondigestible materials discussed above, the trishydroxymethyl alkane esters are a food.

The present invention is also based on the finding that trishydroxymethyl alkane esters esterified with dicarboxylic acid-extended fatty acid derivatives not suggested by Minich, supra, exhibit desirable properties as edible fat mimetics. And dimeric trishydroxymethyl alkanes are similar to their monomeric counterparts. Together, monomeric and dimeric trishydroxymethyl alkane fatty acid and dicarboxylic acid-extended fatty acid esters comprise a new class of partially digestible synthetic fat mimetics.

The trishydroxymethyl alkane esters of this invention comprise esterified trishydroxymethyl compounds having the following general formula:

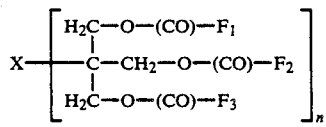

where n=1 or 2, X is an alkyl group having from 1 to 5 carbons when n=1, or an alkyl, other or ester bridge having I to 8 carbons when n=2, and $F_1$, $F_2$, and $F_3$ are fatty acid residues or dicarboxylate-extended fatty acid residues.

Thus, the compounds of this invention comprise monomeric trishydroxymethyl alkane esters of the general formula:

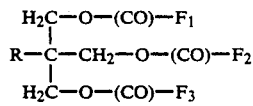

or a trishydroxymethyl alkane ester dimer coupled by an alkyl, ether, or ester bridge having 1 to 8 carbons of the general formula:

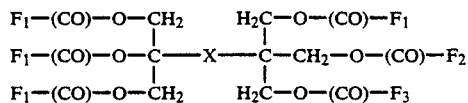

where R is an alkyl group having from 1 to 5 carbons X is an alkyl, ether or ester bridge having 1 to 8 carbons, and $F_1$, $F_2$, and $F_3$ are fatty acid residues or dicarboxylate-extended fatty acid residues.

In the monomeric esters, group R attached to the central carbon, C, may be linear or branched, saturated or unsaturated. Thus, this invention comprises compounds having a neopentyl nucleus, C, to which are attached, in ester linkage to hydroxymethyl groups, $-CH_2-O-$, three fatty acid or dicarboxylate-extended fatty acid residues $F_1$, $F_2$, and $F_3$, and one aliphatic group R, e.g., methyl or ethyl.

In the dimeric esters, the R group may be replaced by a bridge X between two neopentyl nuclei of similar structure. The bridge X can be an alkyl bridge of the general formula,

an ether bridge of the general formula,

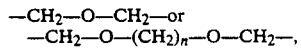

or an ester bridge of the general formula,

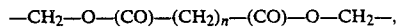

where n=1 to 4.

Bridge X can have a total of from one to eight carbons; in the formulae above, where X is an alkyl and n=1, X has one carbon, and where X is an ester and n=4, X has eight carbons. One preferred dimeric compound is linked by the ether bridge $-CH_2-O-CH_2-$, formed by the condensation of two trishydroxymethyl alkane alcohols prior to esterification. Another preferred dimeric compound is linked by the ester bridge $-CH_2-O-(CO)-(CH_2)_n-(CO)-O-CH_2$, where n=1 or 2, formed by the condensation of two trishydroxymethyl alkane alcohols with one molecule of malonic ($HOOC-CH_2-COOH$) or succinic acid ($HOOC-(CH_2)_2-COOH$) prior to esterification.

Thus, the compounds of this invention comprise trishydroxymethyl monomeric or dimeric alcohols fully esterified with fatty acids or dicarboxylate-extended fatty acids to form physiologically compatible fat replacements for foods and pharmaceuticals.

Examples of trishydroxymethyl alcohols forming the compound backbones are trishydroxymethyl ethane, trishydroxymethyl propane, trishydroxymethyl butane, and trishydroxymethyl pentane, and their dimers Chemical descriptions and formulae used here include isomeric variations.

The fatty acid residues, $F_1$, $F_2$, and $F_3$, may be the same or different, and may comprise a mixture of residues. The term "fatty acids" used here means organic fatty acids containing four to thirty carbons, and may be synthetic or natural, saturated or unsaturated, with straight or branched chains. Preferred fatty acids have from 10 to 20 carbons. Examples of fatty acids that can be used in this invention are butyric, caproic, caprylic, pelargonic, capric, undecanoic, lauric, myristic, palmitic, stearic, arachidic, behenic, oleic, linoleic, linolenic, eleostearic, and arachidonic acids. Mixtures of fatty acids may also be used, such as those obtained from non-hydrogenated or hydrogenated soybean, safflower, sunflower, sesame, peanut, corn, olive, rice bran, canola, babassu nut, coconut, palm kernel, cottonseed, or palm oils.

Alternatively, $F_1$, $F_2$, and $F_2$ may be fatty acid derivatives, such as, for example, halogenated fatty acids, such as brominated oleic acid. Or $F_1$, $F_2$, and $F_2$ may be dicarboxylate-extended fatty acid residues. By "dicarboxylate-extended" or "dicarboxylic acid-extended" fatty acid residues is meant residues formed from the reaction of fatty alcohols with dicarboxylic acids, such as, for example, malonic, succinic, glutaric or adipic acid. These resulting malonyl, succinyl, glutaryl or adipoyl fatty acid residues are, structurally, aliphatic fatty acids with their chains extended by the radicals —OC—CH$_2$—CO—(malonyl), —OC—(CH$_2$)$_2$—CO—(succinyl), —OC—(CH$_2$)$_3$—CO—(glutaryl), —OC—(CH$_2$)$_4$—CO—(adipoyl), and the like. Thus, if a fatty acid residue is denoted by an R', a malonyl-(or malonate-extended) fatty acid residue would be R'—O—(CO)—CH$_2$—(CO)—, a succinyl—(or succinate-extended) fatty acid residue would be R'—O—(-CO)—(CH$_2$)$_2$—(CO)—, a glutaryl—(or glutarate-extended) fatty acid residue would be R'—O—(-CO)—(CH$_2$)$_3$—(CO)—, and so forth.

The preferred partially digestible fat mimetics typically provide from about 0.5 to 6 kcal/gram. In the preferred compounds, $F_1$, $F_2$, and $F_3$ show differential reactivity toward digestive enzymes, so that the compounds become more hydrophilic when catabolized. The compounds may be engineered so that a digestible residue can be an essential or nutritionally desirable fatty acid such as linoleic acid.

The monomeric and dimeric tris-hydroxymethyl alkane esters of this invention may be incorporated either alone, or in combination with another fat and/or fat mimetic, into any food composition or used in conjunction with any edible material. The term "edible material" is broad and includes anything edible. Representative of edible materials which can contain the fat mimetic compounds of this invention in full or partial replacement of natural fat are: frozen desserts, e.g., sherbet, ice cream, ices, or milk shakes; puddings and pie fillings; margarine substitutes or blends; flavored bread or biscuit spreads; mayonnaise; salad dressings; filled dairy products such as filled cream or filled milk; dairy or non-dairy cheese spreads; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as those containing peanut butter or chocolate; chewing gum; bakery products, e.g., cakes, breads, rolls, pastries, cookies, biscuits, and savory crackers; mixes or ingredient premises for any of these; as well as flavor, nutrient, drug or functional additive delivery systems.

The following is a list of representative, but not limiting, examples of monomeric and dimeric trishydroxymethyl alkane esters of this invention:

(1) 1,1,1-Tris-hydroxymethylethane Trioleate

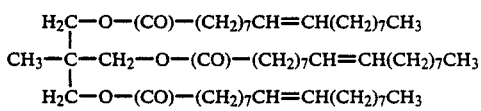

(2) 1,1,1-Tris-hydroxymethylethane Trimyristate

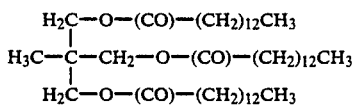

(3) 1,1,1-Tris-hydroxymethylethane Tri-10-undecenate

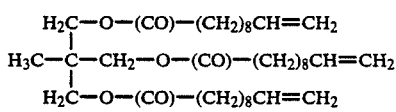

(4) 1,1,1-Tris-hydroxymethylethane Dioleate/Stearate

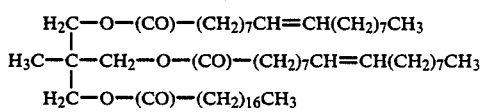

(5) 1,1,1-Tris-hydroxymethylethane Distearate/Oleate

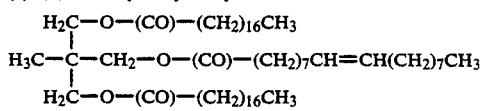

(6) 1,1,1-Tris-hydroxymethylethane Trisuccinyloleate

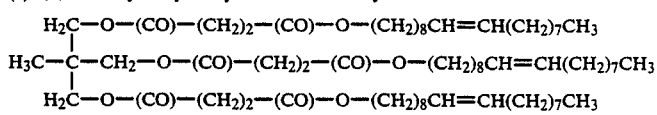

(7) 1,1,1-Tris-hydroxymethylpropane Trioleate

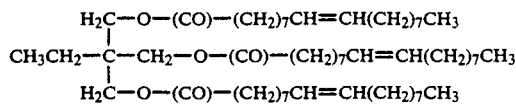

(8) 1,1,1-Tris-hydroxymethylpropane Tri-10-undecenate

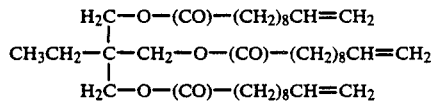

(9) 1,1,1-Tris-hydroxymethylpropane Tristearate

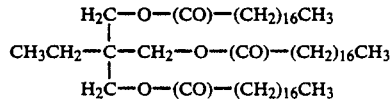

(10) 1,1,1-Tris-hydroxymethylpropane Triadipoyloleate

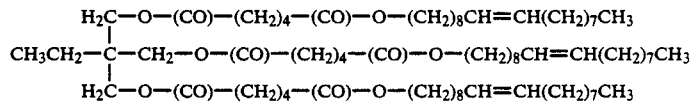

(11) 1,1,1-Tris-hydroxymethylbutane Trioleate

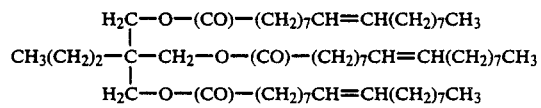

(12) 1,1,1-Tris-hydroxymethylethane Triocta-9,10-dibromo-decanoate

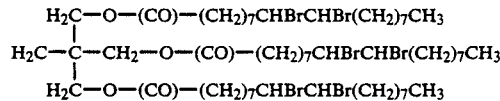

(13) 1,1,1-Tris-hydroxymethylethane Trisuccinylundecenate

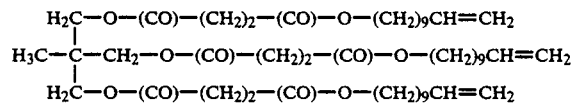

(14) Hexaoleoyldipentaerythritol

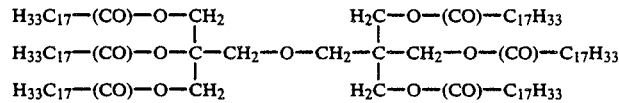

(15) Hexapalmityldipentaerythritol

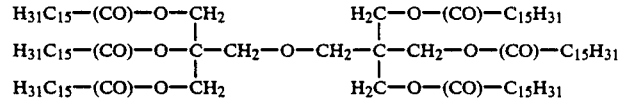

(16) Hexa(10-undecenoyl)dipentaerythritol

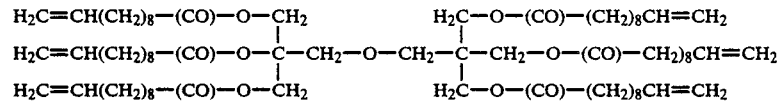

(17) Hexamyristylditrishydroxymethylethane

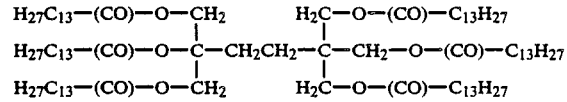

(18) Hexapalmitylditrishydroxymethylpropane

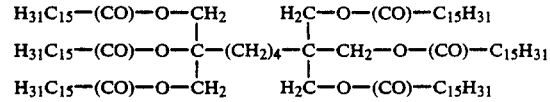

(19) Hexaoleylsuccinylditrishydroxymethlethane

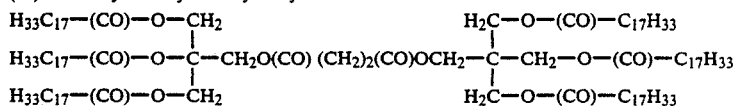

EXAMPLES

The following examples are presented to further illustrate and explain the present invention and should not be taken as limiting in any regard. Unless otherwise indicated, all parts and percentages are by weight (in both the synthesis and food recipe examples), and are based on the weight at the particular stage of the processing being described. The proton NMR spectra have assigned chemical shifts, multiplicities, and intensities consistent with the structures with which they are reported.

EXAMPLE 1

1,1,1-Tris hydroxymethylethane trioleate (also called 1,1,1-tris-(oleoyloxymethyl)ethane), a monomeric trishydroxymethyl alkane ester of this invention, is synthesized in this example.

1,1,1-Tris(hydroxymethyl)ethane (12 g., 0.1 mole) is dissolved in 150 mL tetrahydrofuran (THF) by warming, and to the solution is added 91 g. (0.3 mole) of technical grade oleoyl chloride. When gas evolution subsides, vacuum (-100 torr) is applied for 15 minutes, then the reaction mixture is allowed to stand at ambient temperature and pressure for 16 hours. Evaporation of solvent and filtration of the residue through silica (using 1500 mL hexane) affords 65 g. (71%) of crude product as a yellow oil.

Proton NMR spectrum in $CDCl_3$: chemical shift in ppm (multiplicity, intensity, assignment): 5.35 (multiplet, 6 H, HC=CH), 4.01 (singlet, 6 H, O—$CH_2$), 2.31 (triplet, 6 H, O=C—$CH_2$), 2.02, 1.61 and 1.29 (multiplets, 72 H, —$CH_2$—), 1.01 (singlet, 3 H, —$CH_3$) and 0.87 (triplet, 9 H, —$CH_3$).

Analysis: Calculated for $C_{59}H_{108}O_6$, FW 913.50: C 77.57, H 11.92, O 10.51%; Found: C 77.45, H 11.85%.

EXAMPLE 2

1,1,1-Tris-hydroxymethylethane distearate/oleate, a one-to-three adduct of tris-hydroxymethylethane having a 2:1 ratio of stearic to oleic acids, a tris-hydroxymethyl alkane mixed ester of this invention, is synthesized in this example.

A combination of one equivalent tris-hydroxymethyl ethane with two equivalents stearoyl chloride and one equivalent oleoyl chloride in pyridine affords an oil.

Proton NMR analysis shows a 1.75/1.25 ratio of saturated to unsaturated fatty acid moieties in the product.

EXAMPLE 3

1,1,1-Tris-hydroxyethane dioleate/stearate, a one-to-three adduct of tris-hydroxymethyl ethane and a 2:1 ratio of oleic to stearic acids, another mixed trishydroxymethyl alkane ester of this invention, is prepared in this example.

A combination of one equivalent trishydroxymethyl ethane with one equivalent stearoyl chloride and two equivalents oleoyl chloride in pyridine affords an oil.

Proton NMR analysis shows a 0.86/2.14 ratio of saturated to unsaturated fatty acid moieties in the product.

EXAMPLE 4

1,1,1-Tris-hydroxymethylethane tri-9,10-dibromooctadecenate (also called 1,1,1-tris-(1,10-dibromooctadecanoyloxymethyl)ethane), a substituted monomeric trishydroxymethyl alkane ester of this invention, is synthesized in this example.

To 2.0 g. (0.00218 mole) of 1,1,1-trie(oleoyloxymethyl) ethane is added 23 mL of a solution containing 5% bromine in carbon tetrachloride. After standing for 10 minutes, the reaction mixture is concentrated on a rotary evaporator to give a yellow oil.

Proton NMR spectrum in $CDCl_3$: chemical shift in ppm (multiplicity, intensity, assignment): 4.20 (doublet of doublets, J c. 9 and 3 Hz, 6 H, HCBr), 4.01 (singlet, 6 H, $CH_2$—O), 2.32 (triplet, 6 H, O=C—$CH_2$), 2.05 and 1.85 (multiplets, 12 H, $CH_2$), 1.61 (multiplet, 12 H, $CH_2$—C—Br), 1.30 (multiplet, 54 H, $CH_2$), 1.02 (singlet, 3 H, ethane $CH_3$) and 0.87 (triplet, 9 H, $CH_3$).

EXAMPLE 5

1,1,1-tris-hydroxymethylpropane trioleate (also called 1,1,1-tris-(oleoyloxymethyl)propane), another tris-hydroxymethyl alkane ester of this invention, is synthesized in this example.

A solution of 1,1,1-tris(hydroxymethyl)propane (1.34 g., 0.01 mole), oleoyl chloride (10 mL, c. 0.03 mole) and 15 mL pyridine is shaken overnight at ambient temperature, then filtered through a short bed of silica gel. The filtrate is concentrated on the rotary evaporator to give an oil.

Proton NMR spectrum in $CDCl_3$: chemical shift in ppm (multiplicity, intensity, assignment): 5.35 (multiplet, 6 H, HC=CH), 4.01 (singlet, 6 H, $CH_2$—O), 2.30 triplet, 6 H, $O_2C$—$CH_2$), 2.01 (broad multiplet, 12 H, C=C—$CH_2$), 1.60 (multiplet, 6 H, $O_2C$—C—$CH_2$), 1.47 (quartet, 2 H, propane $CH_2$), 1.30 (multiplet, 60 H, $CH_2$), and 0.87–0.88 (superimposed triplets, 12 H, $CH_3$).

EXAMPLE 6

1,1,1-Tris-hydroxymethylethane tri-10-undecenate (also called 1,1,1-tris(10-undecenoyloxymethyl)ethane), another trishydroxymethyl alkane ester of this invention, is synthesized in this example.

To a solution of 1.2 g. (0.01 mole) 1,1,1-tris(hydroxymethyl)ethane in 10 mL pyridine is added 6.5 mL (c. 0.03 mole) 10-undecenoyl chloride. The mixture is shaken overnight at ambient temperature, filtered through silica (eluted with pentane), and the eluate concentrated to afford an oil.

Proton NMR spectrum in $CDCl_3$: chemical shift in ppm (multliplicity, intensity, assignment): 5.78 (multiplet 3 H HC=C), 4.95 (multiplet, 6 H, C=$CH_2$), 3.97 (singlet, 6 H, $CH_2$—O), 2.29 (triplet, 6 H, O=C—$CH_2$), 2.01 (quartet, 6 H, C=C—$CH_2$), 1.59 (apparent quintet, 6 H, O=C—C—$CH_2$), 1.30 (multiplet, 30 H, $CH_2$) and 0.99 (singlet, 3 H, ethane —$CH_3$).

EXAMPLE 7

1,1,1-Tris-hydroxymethyl tri-10-undecenate (also called 1,1,1-tris-(10-undecenoyloxymethyl)propane), another trishydroxymethyl alkane ester of this invention, is prepared in this example.

To a solution of 1.34 g. (0.01 mole) 1,1,1-tris (hydroxymethyl)propane in 10 mL pyridine is added 6.5 mL (c. 0.03 mole) 10-undecenoyl chloride. The mixture is shaken overnight at ambient temperature and filtered through silica (eluted with pentane) Concentration of the eluate affords an oil.

Proton NMR spectrum in $CDCl_3$: chemical shift in ppm (multliplicity, intensity, assignment): 5.81 (multiplet, 3 H, C=CH), 4.95 (multiplet, 6 H, C=$CH_2$), 4.01 (singlet, 6 H, $CH_2$—O), 2.29 (triplet, 6 H, $CH_2$—$CO_2$), 2.02 (apparent quartet, 6 H, C=C—$CH_2$), 1.60 (multiplet, 6 H, $CH_2$—C—$CO_2$), 1.48 (quartet, 2 H, propane $CH_2$), 1.30 (multiplet, 30 H, $CH_2$) and 0.87 (triplet, 3 H, $CH_3$).

EXAMPLE 8

1,1,1-Tris-hydroxymethylethane trisuccinyloleate, a three-to-one adduct of monooleyl succinoyl chloride with 1,1,1-tris(hydroxymethyl)ethane, a dicarboxylate-extended trishydroxymethyl alkane ester of this invention, is prepared in a two-step synthesis in this example.

Monooleyl succinoyl chloride is first prepared. Oleyl alcohol (59.0 g., 0.22 mole), 4-dimethylaminopryidine (6.7 g., 0.054 mole), succinic anhydride (32.0 g., 0.32 mole) and 400 mL pyridine are combined and stirred overnight at ambient temperature. The reaction mixture is then diluted with c. 1500 mL water and extracted with ether. The aqueous layer is acidified (with concentrated HCl) and extracted with ether. The combined extracts are dried over magnesium sulfate, filtered, and concentrated on the rotary evaporator to afford a light brown oil. This is combined with 200 mL thionyl chloride and stirred for 24 hours. Evaporation of the excess thionyl chloride yields a brown oil.

Proton NMR spectrum in $CDCl_3$: chemical shift in ppm (multliplicity, intensity, assignment): 5.35 (multiplet, 2 H, HC=CH), 4.10 (triplet, 2 H, O—$CH_2$), 3.21 (triplet, 2 H, $CH_2$—COCl), 2.68 (triplet, 2 H, $CH_2$—$CO_2$), 2.0 (multiplet, 4 H, C=C—$CH_2$), 1.62 (multiplet, 2 H, O—C—$CH_2$), 1.30 (multiplet, 22 H, $CH_2$), and 0.87 (triplet, 3 H, $CH_3$).

This monooleyl succinoyl chloride (13.8 g., 0.36 mole) is then added to a solution of 1.32 g. (0.01 mole) 1,1,1-tris(hydroxymethyl)ethane in 15 mL pyridine. The mixture is shaken overnight at ambient temperature, filtered through silica (eluted with pentane), and the eluate is concentrated on the rotary evaporator to give an oil.

Proton NMR spectrum in $CDCl_3$: chemical shift in ppm (multliplicity, intensity, assignment): 5.35 (multiplet, 6 H, HC=CH), 4.06 (triplet, 6 H, oleyl O—$CH_2$), 4.01 (singlet, 6 H, ethane C—$CH_2$—O), 2.63 (A2B2 pattern, 12 H, O=C—$CH_2$—$CH_2$—C=O), 2.01 (multiplet, 8 H, C=C—$CH_2$), 1.61 (multiplet, 6 H, oleyl O—C—$CH_2$), 1.30 (multiplet, 66 H, $CH_2$), 1.02 (singlet 3 H, ethane —$CH_3$), and 0.87 (triplet, 9 H, oleyl $CH_3$).

EXAMPLE 9

1,1,1-Tris-hydroxymethylethane trimyristate (also called 1,1,1-tris(tetradecanoyloxymethyl)ethane), another trishydroxymethyl alkane ester of this invention, is prepared in this example.

A solution of tris(hydroxymethyl)ethane (1.20 g., 0.01 mole), myristoyl chloride (7.38 g., 0.03 mole) and pyridine (25 mL) is shaken at ambient temperature overnight. The reaction mixture is filtered, concentrated and refiltered through silica gel to afford an oil.

EXAMPLE 10

1,1,1-Tris-hydroxymethyl ethane trimyristate (also called 1,1,1-tris(myristoyloxymethyl) ethane) is prepared in an alternate procedure in this example.

Myristoyl chloride (1000 g., 4.05 mole) is charged to a 2-liter flask equipped with a magnetic stirrer bar, thermometer, and a gas outlet which is attached to a vacuum source by means of an acid trap (containing 500 g. solid NaOH pellets). With stirring, 160 g. (1.33 mole) 1,1,1-tris (hydroxymethyl)ethane is added and the slurry is placed under reduced pressure (−100 torr) and is warmed by means of a heating mantle. Between 40° and 80° C. gas (HCl) evolves vigorously from the reaction flask, and vacuum may need to be interrupted momentarily to avoid reactant carry-over. As gas evolution subsides, the temperature is raised to 120° C. (−100 torr), and these conditions are maintained until gas evolution is complete. Stirring under vacuum is continued for one hour, and the temperature is allowed to fall to about 80° C., vacuum is released, and the crude product is passed through a falling film still (conditions: 168° C., 0.8 torr) to remove excess fatty acid residues.

The product oil is steam deodorized (conditions: 6 wt. % steam, 195°-205° C., ca. 0.5 torr). Upon cooling, the colorless oil affords a white solid with a melting point of 36°-40° C. The yield is quantitative. The titratable acidity (expressed as myristic acid) is less than 0.4 wt. %.

EXAMPLE 11

1,1,1-Tris-hydroxymethylethane trisuccinylundecenate (also called 1,1,1-tris(5-oxa-4-oxohexadeca-15-enoyloxymethyl) ethane), another dicarboxylate-extended tris-hydroxymethyl alkane ester of this invention, is prepared in this example.

A solution of tris(hydroxymethyl)ethane (1.20 g., 0.01 mole), monoundecenyl succinate (8.64 g., 0.03 mole) and pyridine (25 mL) is shaken at ambient temperature overnight. The reaction mixture is filtered, concentrated and refiltered through silica to afford an oil.

EXAMPLE 12

Hexaoleoyldipentaerythritol, a dimeric compound of this invention, is prepared in this example.

A mixture of dipentaerythritol (2.54 g., 0.01 mole), oleoyl chloride (18 g., 0.06 mole) and pyridine (40 mL) is shaken at ambient temperature overnight. The mixture is then filtered, concentrated and refiltered through silica to afford an oil.

EXAMPLE 13

Hexa(10-undecenoyl)dipentaerythritol another trishydroxymethyl alkane ester dimer of this invention, is synthesized in this example.

A mixture of dipentaerythritol (2.54 g., 0.01 mole), 10-undecenoyl chloride (12.96 g., 0.06 mole) and pyridine (35 mL) is shaken at ambient temperature overnight. The mixture is filtered, concentrated and refiltered to afford an oil.

EXAMPLE 14

This example outlines the procedure for estimating the in vitro digestibility of the synthetic fat mimetics of this invention using pancreatic lipase.

Preparation of Reagents and Materials

1. Buffer: A pH 7.1 phosphate buffer is prepared by dissolving 6.8 g. $KH_2PO_4$ in 1 L. of millipore filtered water (to yield 0.05 M phosphate). Fifty mg. $Ca(NO_3)_2$ and 5.0 g. cholic acid (Na salt, an ox bile isolate from Sigma) are added to give 300 microM $Ca^{++}$ and 0.5 % cholic acid in 0.05 M phosphate. The pH is adjusted to approximately 7.1 with solid NaOH. Several drops of Baker "Resi-analyzed" toluene are added to prevent bacterial growth during storage at 3°-5° C.

2. Lipase: About 15 mg./mL commercial porcine pancreatic lipase from U.S. Biochemical Corporation is dissolved in buffer.

3. Substrates and Standards: A 1.0 mL volumetric flask is charged with an amount of lipid substrate (test substance or standard) calculated to give a concentration of 200 nanomoles per microliter in Baker "Resi-analyzed" toluene. (The proper concentration may be approximated by doubling the molecular weight of the lipid in question, dividing by 10, and diluting to the mark; this yields about 200 nanomoles per microliter.) This preparation affords the substrate to be used in the hydrolysis reactions.

Fatty acids and glyceride standards from Nu Chek or Sigma are prepared for elution on TLC plates (prewashed with 1:1 chloroform/methanol) by diluting the substrate solution with 10:1 toluene (1 part substrate plus 9 parts toluene) in septum vials.

Procedure

In a 25 mL Erlenmeyer, emulsify 20 mL buffer and 40 microliters of substrate using an ultrasonic disrupter at a microtip maximum setting for approximately 10 seconds. This results in a 0.4 microliter/milliliter emulsion. Place in a 37° C. water bath and stir vigorously. After temperature equilibration, add 40 microliters of enzyme solution and start timing. Remove 5.0 mL aliquots at convenient time intervals for analysis. To establish a standard curve for triolein, aliquots are taken at 10, 20, 30 and 40 minutes. A zero time control should be run for all test compounds.

Add the aliquot to a 15 mL glass centrifuge tube containing a drop of concentrated HCl. Add approximately 3 mL of a 2:1 mixture of $CHCl_3:CH_3OH$ and shake vigorously. Centrifuge at approximately 5000 rpm for 5 minutes and transfer the bottom layer with a Pasteur pipet to a 5 mL septum vial. Repeat the extraction step once and combine the two bottom layers. Evaporate the solvent in nitrogen gas. After about half of the solvent is removed, add an equivalent volume absolute ethanol and continue evaporation in a nitrogen stream until dryness is achieved. Samples may be warmed with a heat gun to facilitate drying.

When the samples are dry, add exactly 200 microliters of toluene containing 10% DMSO, cap tightly, and spot TLC plate with 2.0 microliters per channel. (If 100% extraction efficiency of a zero time control, this amounts to 20 nanomoles of substrate spotted on the plate.) Develop with a suitable solvent system, for example, hexane: ethyl ether: acetic acid in a ratio of 60:40:1. After 15 cm elution, dry plate with a heat gun and determine amounts of starting substrate and products of hydrolysis by scanning 10 to 20 nanomoles per channel at a wavelength of 190 nm using the CAMAG TLC Scanner II densitometer equipped with a Spectra Physics 4270 integrator and comparing with controls run at the same time.

Results

Using this procedure with the 1,1,1-tris-hydroxymethyl ethane trioleate prepared in Example 1, limited hydrolysis is observed after three hours contact with pancreatic lipase. Using a triglyceride control, triolein is substantially hydrolyzed in 10 minutes with this enzyme system.

EXAMPLE 15

This example illustrates how the novel fat mimetics of this invention are screened for caloric availability by a carefully controlled in vivo animal feeding study.

An experimental relationship between total calories ingested and animal body weight gain is established by monitoring the body weight gain associated with consumption of a nutritionally balanced diet containing varying concentrations of a reference substance such as corn oil which has a known caloric availabilty. Correlations between total calories ingested and body weight gain are excellent ($r=0.99$).

Caloric availability of an unknown substance is evaluated by substituting a specific weight of the unknown substance for the reference substance and observing the body weight gain. The gain in body weight is equated to a total number of calories using the correlation previously established for the reference data. The estimated number of calories ingested are divided by the weight of unknown substance to give the apparent calories per gram for the unknown substance. Generally speaking, in these bioavailability studies, the degree of perianal pelt soiling correlates with reduced bioavailability.

The test animals are six-week-old male Sprague-Dawley rats obtained from the Portage, Michigan facility of the Charles River Laboratories, Inc. After acclimation for 15 days, the test duration is 14 days. The dietary requirements are established by observing the actual feed consumption of animals provided with unlimited feed. All diets are prepared to contain 50% of the established dietary requirements plus any supplements of reference or unknown substances In all tests so designed the test animals are maintained in very good health.

The test feeds are AIN-76A and fortified AIN-76A (hereinafter abbreviated "fort") AIN-76A (Teklad). The major components of these diets are as follows:

| component | AIN-76A | fortified AIN-76A |
| --- | --- | --- |
| casein | 20% | 40% |
| corn starch | 15 | 8.08 |
| sucrose | 50 | 26.02 |
| fiber | 5 | 5 |
| corn oil | 5 | 5 |
| AIN mineral mix | 3.5 | 7 |
| AIN vitamin mix | 1 | 2 |
| choline | 0.2 | 0.4 |
| methionine | 0.3 | 0.6 |
| total | 100% | 100% |
| calc. caloric density | 3.85 kcal/gm | 3.9 kcal/gm |

Using these diets supplemented by reference or test substances fed as microencapsulated oils, sample body weight (hereinafter abbreviated "wgt") gains for example animals A and B fed corn oil as a reference (9.0 calories/gram) are as follows:

| diet supplied | Animal A | | Animal B | |
|---|---|---|---|---|
| | wgt gain (grams) | calories consumed | wgt gain (grams) | calories consumed |
| ad lib AIN-76A | 73.6 | 1275 | 82.4 | 1370 |
| 50% fort | −3.4 | 651 | −3.8 | 691 |
| 50% fort + 7.75% gelatin | 9.0 | 705 | 8.3 | 747 |
| 50% fort + 7% corn oil | 13.9 | 768 | 15.2 | 831 |
| 50 fort + 14% corn oil | 28.3 | 913 | 37.9 | 998 |
| 50% fort + 21% corn oil | 57.7 | 1093 | 63.3 | 1183 |

The rats were fed a diet of 50% fort and 21% 1,1,1-tris hydroxymethylethane trioleate prepared in Example 1 as a test compound under the foregoing procedure, and their weight gain was determined. Using the base line control data and the data from the test compound, it was determined that 1,1,1-tris hydroxymethylethane trioleate gave about 3.3 kcal/gram upon being metabolized.

EXAMPLE 16

Milk Chocolate. In this example, a synthetic fat mimetic of this invention prepared in Example 9 is used to prepare low calorie milk chocolate.

Equal parts of cocoa powder, sugar and fat mimetic are mixed in a glass beaker and are incubated with frequent stirring at 65° C. until a smooth, uniform fudge-like mixture is obtained Lecithin, which is normally added at about 0.5% to chocolate and palm kernel oil to lower viscosity, is unnecessary since the viscosity of the fat mimetic is well suited to pouring into molds or en-robing. The hot mixture is poured into molds and quench cooled by placing in a freezer at approximately −10° C. No tempering regimen is necessary.

EXAMPLE 17

Filled Cream. About 18 Kg of a fat mimetic of Example 3 may be homogenized with 82 Kg of skim milk in a conventional dairy homogenizer to afford a "filled cream" composition.

EXAMPLE 18

Ice Cream. The "filled cream" composition of Example 17 (68 parts) may be combined with 15 parts condensed skim milk, 15 parts sugar, 0.5 parts gelatin, 1.0 part flavor, and 0.25 parts color to produce an ice cream mix which is processed in the normal manner to yield a modified ice cream product.

EXAMPLE 19

Filled Milk. About 100 parts of the filled cream composition prepared in Example 17 may be combined with about 620 parts of skim milk to prepare a "filled milk" composition.

EXAMPLE 20

Cheese Products. The filled milk product obtained in Example 17 may be treated like natural milk in the normal cheese making process (as is practiced, for example in the production of cheddar or swiss cheese) Preferably 10% butter oil is added to the fat mimetic portion of the filled milk product before it is employed in this process to enhance the proper flavor development of the cheese products.

EXAMPLE 21

Butter cream icing may be prepared by blending:

| Ingredient | g. |
|---|---|
| Sugar | 227.0 |
| Fat mimetic of Example 9 | 70.8 |
| Water | 28.4 |
| Non-Fat Dry Milk | 14.0 |
| Emulsifier | 1.4 |
| Salt | 1.0 |
| Vanilla | 1.0 |

All of the ingredients are creamed in a mixer at medium speed.

EXAMPLE 22

Vanilla Wafers. Twenty-five parts of a fat mimetic of Example 5 may be blended with 100 parts flour, 72 parts granulated sugar, 5 parts high fructose corn syrup, 1 part non-fat dry milk, 1 part salt, 1/10 part ammonium bicarbonate, 1 part dried egg yolk, 1/10 part sodium bicarbonate, and 55 parts water. The dough so formed may be rolled, wire cut to ¼ inch thickness, and baked by the usual process to give a vanilla wafer cookie.

EXAMPLE 23

Sugar Cookies. Sugar cookies may be prepared by blending:

| Ingredient | g. |
|---|---|
| Sugar | 231 |
| Fat Mimetic of Example 3 | 114 |
| Salt | 3.7 |
| Sodium Bicarbonate | 4.4 |
| Water | 37.4 |
| 5.9% Dextrose Solution (wt/wt) | 58.7 |
| Flour | 351 |

All of the ingredients are creamed together. The dough so formed may be extruded (the dough is very tacky) and baked by the usual process.

EXAMPLE 24

Sprayed Crackers. A dough prepared from 100 parts flour, 5 parts sugar, 1.5 parts malt, 7.5 parts of the fat mimetic prepared in Example 5, 1 part salt, 0.9 parts sodium bicarbonate, 2.5 parts non-fat dry milk, 2.5 parts high fructose corn syrup, 0.75 parts monocalcium phosphate, and 28 parts water is sheeted, stamped, and baked to produce a cracker product.

The above descriptions are for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A food composition comprising an edible fat compound of the formula

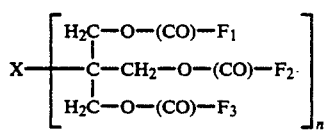

where X is an alkyl bridge having 1 to 8 carbons, and $F_1$, $F_2$, and $F_3$ are dicarboxylate-extended fatty acid residues.

2. The composition according to claim 1 wherein X is an alkyl bridge of the formula $-(CH_2)_n-$, where $n=1$ to 4.

3. The composition according to claim 1 wherein the dicarboxylate-extended fatty acid residues comprise $C_4$ to $C_{30}$ dicarboxylate-extended fatty acid residues.

4. The composition according to claim 3 wherein the dicarboxylate-extended fatty acid residues comprise $C_{10}$ to $C_{20}$ dicarboxylate-extended fatty acid residues.

5. The composition according to claim 1 wherein the dicarboxylate-extended fatty acid residues are derived from fatty acids selected from the group consisting of butyric, caproic, caprylic, pelargonic, capric, undecanoic, lauric, myristic, palmitic, stearic, arachidic, behenic, oleic, linoleic, linolenic, eleostearic, and arachidonic acids, and mixtures thereof.

6. The composition according to claim 1 wherein the dicarboxylate-extended fatty acid residues are derived from oils selected from the group consisting of non-hydrogenated and hydrogenated soybean, safflower, sunflower, sesame, peanut, corn, olive, rice bran, canola, babassu nut, coconut, palm kernel, cottonseed, and palm oils.

7. The composition according to claim 1 wherein the dicarboxylate-extended fatty acid resides comprise malonyl-, succinyl-, glutaryl-, and adipoyl-extended $C_{10}$ to $C_{20}$ fatty acid residues.

8. An edible fat composition comprising the dicarboxylate-extended fatty acid esters of a dimeric 1,1,1-trishydroxymethyl ethane, propane and butane, wherein the dimeric esters comprise two monomeric esters joined by an alkyl bridge having 1 to 8 carbons.

9. The composition according to claim 8 wherein said alkyl bridge has the formula $-(CH_2-)_n$, where $n=1$ to 4.

10. The composition according to claim 8 wherein the dicarboxylate-extended fatty acid esters comprise esters of $C_4$ to $C_{30}$ fatty alcohols reacted with dicarboxylic acids selected from the group consisting of malonic, succinic, glutaric, and adipic acids.

11. An edible fat compound comprising two 1,1,1-trishydroxymethyl ethane or propane monomers joined by an alkyl bridge having one to eight carbons and esterified with dicaboxylate-extended fatty acids.

12. The compound of claim 11 wherein said bridge comprises one to four carbon atoms.

13. The compound of claim 11 wherein the dicarboxylate-extended fatty acids are derived from fatty acids selected from the group consisting of butyric, caproic, caprylic, pelargonic, capric, undecanoic, lauric, myristic, palmitic, stearic, arachidic, behenic, oleic, linoleic, linolenic, eleostearic, and arachidonic acid esters, and mixtures thereof.

14. The compound of claim 11 wherein the dicarboxylate-extended fatty acids are selected from the group consisting of non-hydrogenated and hydrogenated soybean, safflower, sunflower, sesame, peanut, corn, olive, rice bran, canola, babassu nut, coconut, palm kernel, cottonseed, and palm oil dicarboxylate-extended fatty acids.

15. The compound of claim 11 wherein the dicarboxylate-extended fatty acid acids comprise malonyl-, succinyl-, glutaryl-, and adipoyl- $C_{10}$ to $C_{20}$ fatty acids.

16. The composition of claim 1 wherein said food composition is a frozen dessert.

17. The composition of claim 1 wherein said food composition is selected from the group consisting of puddings and pie fillings.

18. The composition of claim 1 wherein said food composition is a margarine substitute.

19. The composition of claim 1 wherein said food product is selected from the group consisting of mayonnaise and salad dressing.

20. The composition of claim 1 wherein said food composition is a spread for breads or biscuits.

21. The composition of claim 1 wherein said food composition is a dairy product.

22. The composition of claim 1 wherein said food composition is a meat substitute.

23. The composition of claim 1 wherein said food composition is a fatty candy.

24. The composition of claim 1 wherein said food composition is a bakery product.

25. A method of preparing a reduced calorie food composition which comprises formulating said composition with a fat mimetic ingredient of the formula:

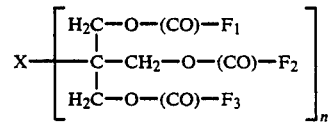

where X is an alkyl bridge having 1 to 8 carbons, and $F_1$, $F_2$, and $F_3$ are dicarboxylate-extended fatty acid residues.

26. The method according to claim 25 wherein $F_1$, $F_2$, and $F_3$ are selected from the group consisting of malonyl-, succinyl- and glutaryl-extended $C_{10}$ to $C_{20}$ fatty acid residues.

27. The method of claim 25 wherein said food composition is a bakery product.

28. The method of claim 25 wherein said food composition is a frozen dessert.

29. The method of claim 25 wherein said food product is selected from the group consisting of dairy products and dairy substitutes.

30. The method of claim 25 wherein said food product is a fatty candy.

31. The method of claim 25 wherein said food product is a meat substitute.

32. In a food composition having a digestible fat ingredient the improvement wherein at least a portion of the digestible fat ingredient is replaced by a malonyl-, succinyl-, and glutaryl-extended $C_{10}$ to $C_{20}$ fatty acid ester of trishydroxymethylethane or trishydroxymethylpropane, to produce a reduced calorie product.

* * * * *

UNITED STATES PATENT AND TRADEMARK OFFICE
CERTIFICATE OF CORRECTION

PATENT NO. : 4,992,292

DATED : February 12, 1991

INVENTOR(S) : Lawrence P. Klemann, John W. Finley and Anthony Scimone

It is certified that error appears in the above-identified patent and that said Letters Patent is hereby corrected as shown below:

Column 3, line 45: "other" should be --ether--. See the

Column 6, line 25: "premises" should be --premixes--. See

Column 7, structure 12: "$H_2C$-" should be --$H_3C$---. See the

Column 10, line 19: "trie" should be --tris--. See the

Signed and Sealed this

Seventh Day of December, 1993

Attest:

BRUCE LEHMAN

Attesting Officer

Commissioner of Patents and Trademarks